(12) United States Patent
Tu et al.

(10) Patent No.: US 8,079,557 B2
(45) Date of Patent: Dec. 20, 2011

(54) SUCTION CUP DEVICE

(76) Inventors: Tsung-Tzong Tu, Taichung (TW);
Tsung-An Tu, Taichung (TW)

( * ) Notice: Subject to any disclaimer, the term of this patent is extended or adjusted under 35 U.S.C. 154(b) by 0 days.

(21) Appl. No.: 12/880,786

(22) Filed: Sep. 13, 2010

(65) Prior Publication Data

US 2011/0168856 A1 Jul. 14, 2011

(30) Foreign Application Priority Data

Jan. 8, 2010 (TW) .............................. 99200353 U (51) Int. Cl.
*A45D 42/14* (2006.01)

(52) U.S. Cl. .................... 248/206.2; 248/309.3; 248/683

(58) Field of Classification Search .................. 248/683, 248/467, 205.5, 206.2, 309.3, 363
See application file for complete search history.

(56) References Cited

U.S. PATENT DOCUMENTS

| 355,021 | A | * | 12/1886 | Lang | 248/205.8 |
| 4,133,575 | A | * | 1/1979 | Mader | 296/95.1 |
| 6,478,271 | B1 | * | 11/2002 | Mulholland | 248/205.8 |
| 6,736,278 | B2 | * | 5/2004 | Chang | 211/90.01 |
| 7,021,593 | B1 | | 4/2006 | Fan | |
| 7,357,361 | B2 | * | 4/2008 | Yen | 248/205.8 |
| 2010/0116954 | A1 | | 5/2010 | Fan | |

FOREIGN PATENT DOCUMENTS

| DE | 20 2004 020077 U1 | 5/2005 |
| DE | 20 2007 008376 U1 | 9/2007 |
| GB | 2275723 A * | 9/1994 |

* cited by examiner

*Primary Examiner* — A. Joseph Wujciak, III
(74) *Attorney, Agent, or Firm* — Kirton & McConkie; Evan R. Witt (57) ABSTRACT

A suction cup device includes a cup forming unit cooperating with a flat surface to create a volume-variable space, a liftable rod secured to a central portion of the cup forming unit, a bracing shell member having a force-transmitting surrounding wall in engagement with a peripheral portion of the cup forming unit, and a twistable cap member having a surrounding bottom wall in abutting against a circumferential abutment region of the bracing shell member and threadedly engaged with the liftable rod such that a manually twisted movement of the twistable cap member can result in axial movement of the rod so as to pull the central portion away from the flat surface to produce a reduced pressure in the volume-variable space and a biasing force to thereby ensuring fluid-tight engagement of the cup forming unit with the flat surface.

6 Claims, 8 Drawing Sheets

SUCTION CUP DEVICE

CROSS-REFERENCE TO RELATED APPLICATION

This application claims priority of Taiwanese Utility Model Application No. 099200353, filed on Jan. 8, 2010, the disclosure of which is herein incorporated by reference.

BACKGROUND OF THE INVENTION

1. Field of the Invention

This invention relates to a suction cup device, more particularly to a suction cup device which defines a volume-variable space to produce an adjustable reduced pressure with a desired suction strength.

2. Description of the Related Art

Figure 1:
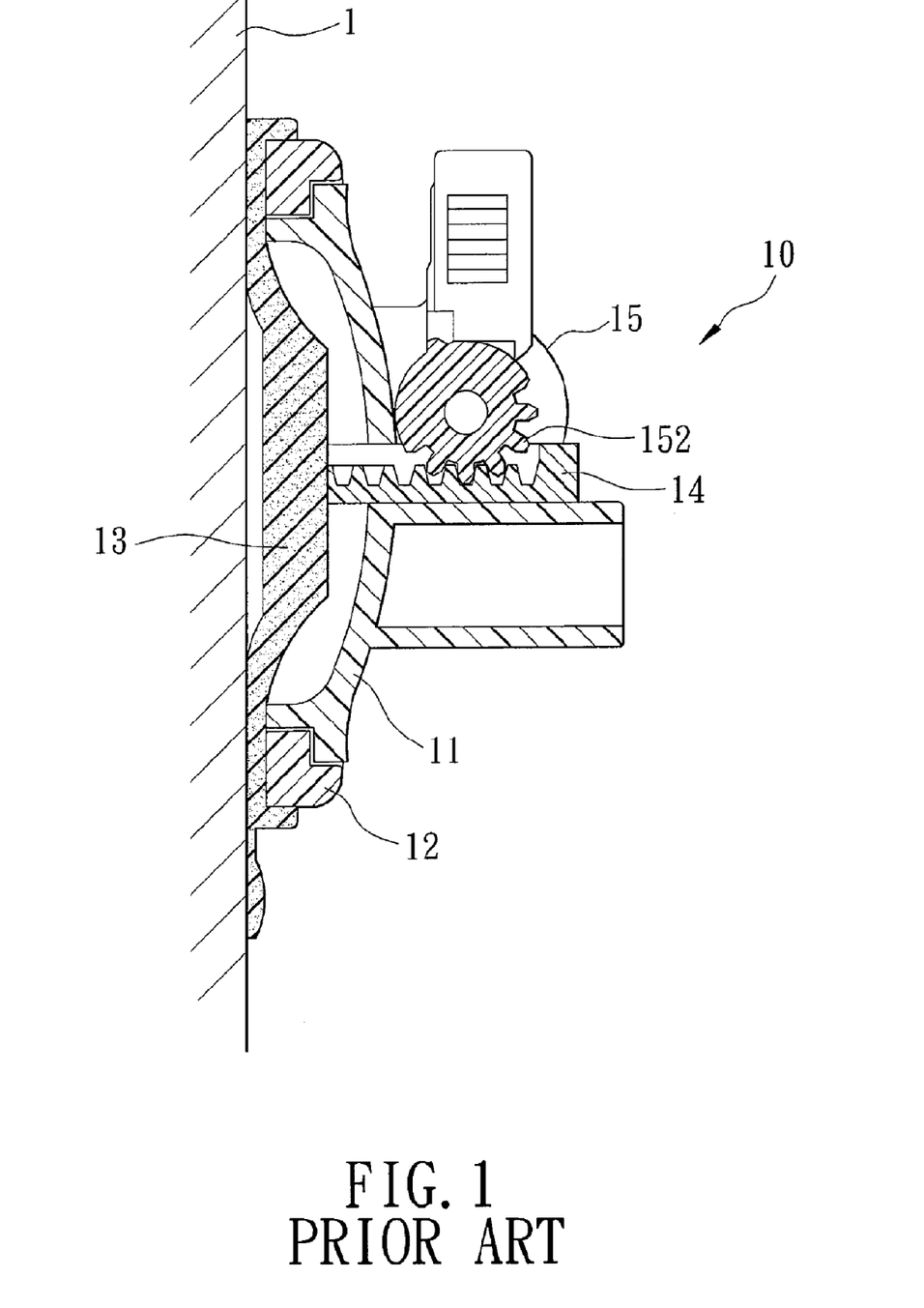
FIG. 1 is a sectional view of a conventional suction cup device disclosed in US 2010/0116954 A1.
Figure 2:
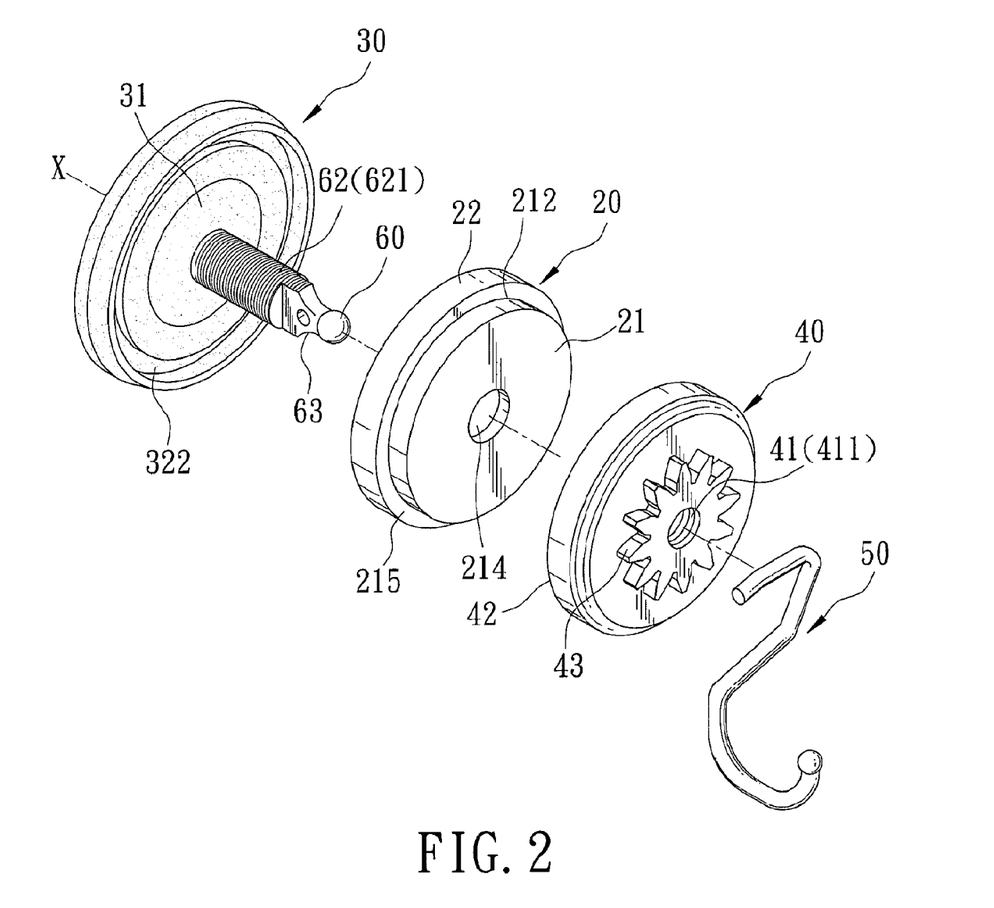
FIG. 2 is an exploded perspective view of the first preferred embodiment of a suction cup device according to this invention.
Figure 3:
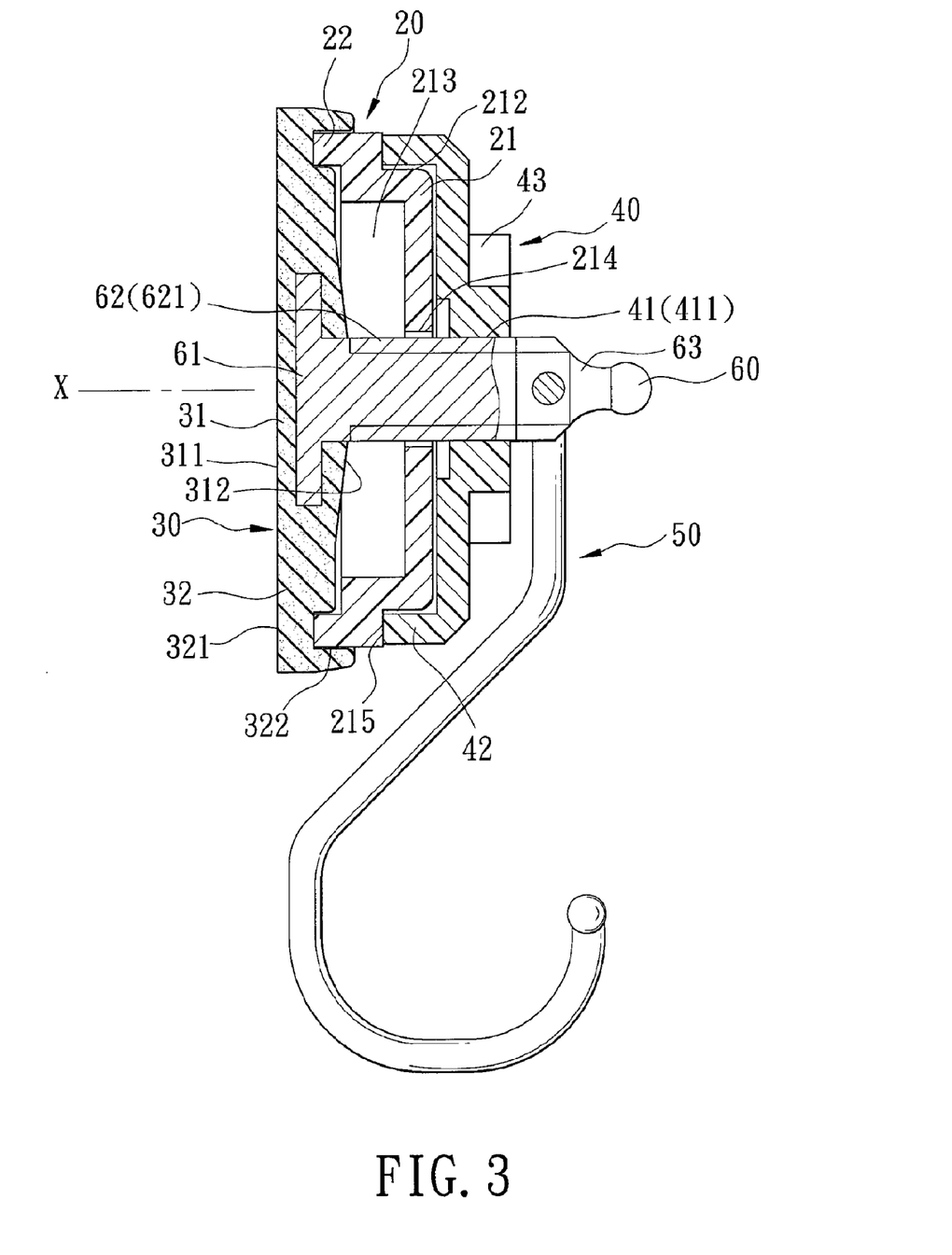
FIG. 3 is a sectional view of the first preferred embodiment.
Figure 4:
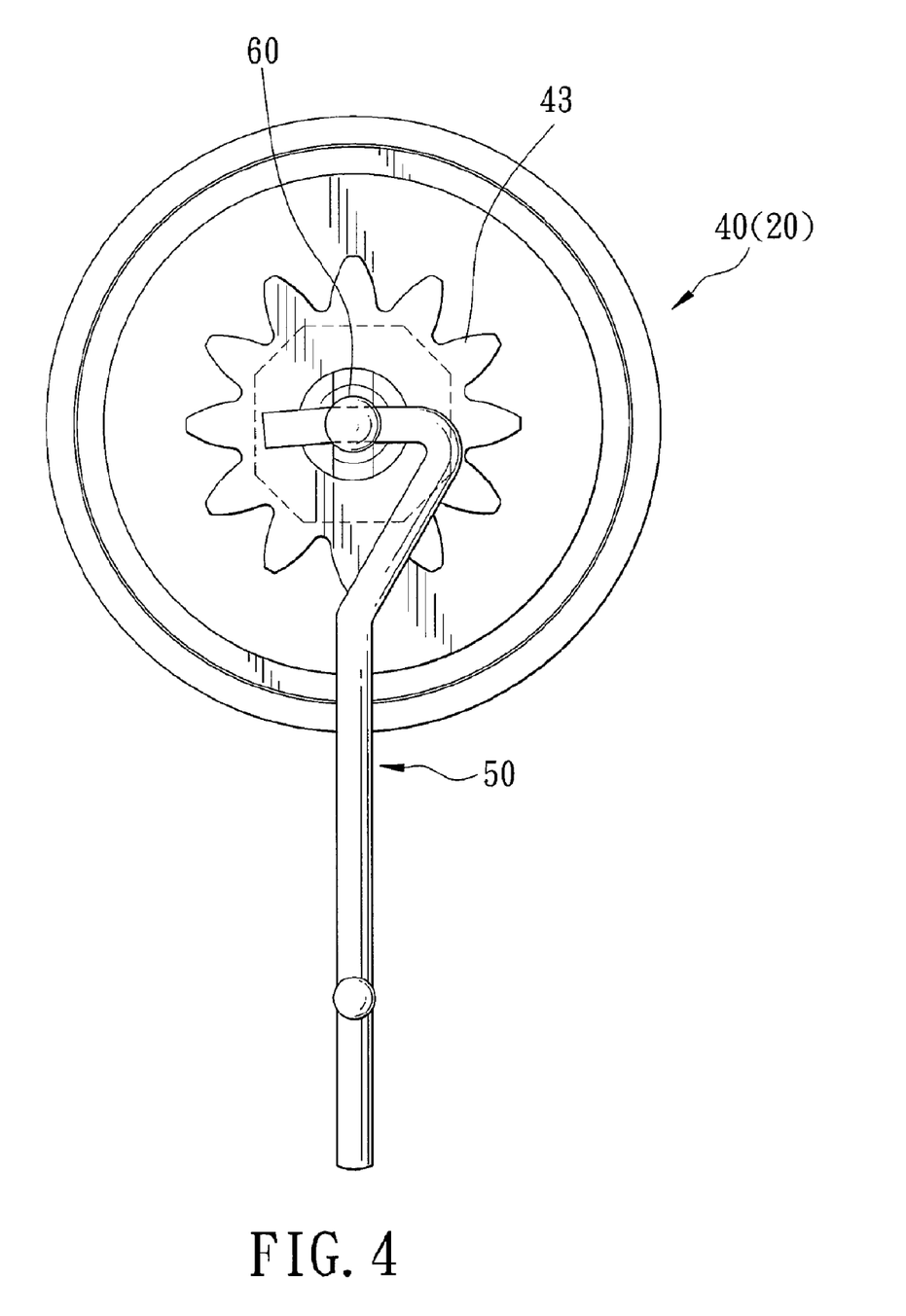
FIG. 4 is a front view of the first preferred embodiment.

FIG. 1 shows a conventional suction cup device 10 disclosed in U.S. Patent Publication No. US 2010/0116954 A1, which is adapted to be attached to a flat wall 1, and which includes a suction cup 13 with a rack 14 connected to the center thereof, a mount body 11 attached to the suction cup 13 by virtue of a pressing ring 12, and a lever 15 pivotably mounted on the mount body 11 and provided with a pinion 152 meshing with the rack 14. By turning the lever 15, a central part of the suction cup 13 can be pulled away from the flat wall 1 to produce a reduced pressure in an enclosed space between the flat wall 1 and the suction cup 13 for holding the suction cup device 10 against the flat wall 1. However, in the conventional suction cup device 10, the strength of suction force generated as a result of movement of the central part of the suction cup 13 is constant, and cannot be increased after a period of use, thereby resulting in undesired disengagement of the suction cup device 10 from the flat wall 1.

Another conventional suction cup device is disclosed in U.S. Pat. No. 7,021,593 B1, which includes a suction lock/release disposed on a lever and deep scoops disposed on the mount body to lock the lever at a fixed angle so as to adjust the suction strength of a suction cup. However, assembly of the suction lock/release to the lever is troublesome. Besides, manual operation of the suction lock/release is required to lock or unlock the lever, thereby rendering the adjustment complicated.

SUMMARY OF THE INVENTION

An object of the present invention is to provide a suction cup device which can produce a reduced pressure with an adjustable and desired suction strength to ensure tight engagement with a flat surface, and which can be assembled and operated conveniently.

According to this invention, the suction cup device includes a cup forming unit, a liftable rod, a bracing shell member, and a twistable cap member. The cup forming unit is adapted to confront a flat surface, and defines a central axis normal to the flat surface to cooperate therewith to create a volume-variable space. The cup forming unit has a central portion and a peripheral portion. The central portion is made from an elastic material to be deformed when the central portion is subjected to a pulling force along the central axis away from the flat surface so as to produce a reduced pressure in the volume-variable space while acquiring a biasing force to urge the central portion toward the flat surface. The peripheral portion extends from the central portion to terminate at a marginal end that is configured to be in fluid-tight engagement with the flat surface. The liftable rod has a base end secured to the central portion, and a rod segment extending from the base end along the central axis and having an externally threaded region. The bracing shell member includes amount wall and a force-transmitting surrounding wall. The mount wall has a central hole permitting passage of the rod segment therethrough, and a circumferential abutment region disposed outwardly and radially of the central hole. The force-transmitting surrounding wall extends in the direction of central axis from the circumferential abutment region, and is in engagement with the peripheral portion. The twistable cap member has a surrounding bottom wall abutting against the circumferential abutment region, and an inner tubular surface having an internally threaded region threadedly engaged with the externally threaded region. With a manually twisted movement of the twistable cap member, the rod segment is axially moved relative to the inner tubular surface to impart the base end with the pulling force. Once the manually twisted movement is discontinued for reaching a predetermined value of the reduced pressure, the surrounding bottom wall is urged by the biasing force to abut against the circumferential abutment region, thereby ensuring the fluid-tight engagement of the marginal end with the flat surface.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Referring to FIGS. 2 to 5, the first preferred embodiment of a suction cup device according to the present invention is shown to comprise a cup forming unit 30, a liftable rod 60, a bracing shell member 20, and a twistable cap member 40.

The cup forming unit 30 is adapted to confront a flat surface (I), such as of a vertical wall 1, and defines a central axis (X) normal to the flat surface (I) to cooperate therewith to create a volume-variable space (A). In this embodiment, the cup forming unit 30 is made from an elastic material to be of a single-piece structure, and has a central portion 31 and a peripheral portion 32. The central portion 31 has suction-side and pull-side central surfaces 311, 312 opposite to each other in a direction of the central axis (X). When the central portion 31 is subjected to a pulling force along the central axis (X) away from the flat surface (I), the suction-side surface 311 is deformed to produce a reduced pressure in the volume-variable space (A) while acquiring a biasing force to urge the central portion 31 toward the flat surface (I). The peripheral portion 32 extends radially and outwardly from the central portion 31 to terminate at a marginal end 321. The marginal end 321 is configured to be in fluid-tight engagement with the flat surface (I). The peripheral portion 32 has a surrounding groove 322.

The liftable rod 60 has a base end 61 secured to the central portion 31, and a rod segment 62 extending from the base end 61 along the central axis (X) and having an externally threaded region 621, and a holder end 63 opposite to the base end 61 in the direction of the central axis (X) for holding a fixture 50, such as a hook so as to hang an object 100.

The bracing shell member 20 is made from a rigid material, and includes a mount wall 21 and a force-transmitting surrounding wall 22. The mount wall 21 is spaced apart from the cup forming unit 30 in the direction of the central axis (X) by an accommodation space 213, and has a central hole 214 permitting passage of the rod segment 62 therethrough, and a surrounding marginal cutout portion 212 which is disposed outwardly and radially of the central hole 214 and which extends towards the peripheral portion 32 to terminate at a circumferential abutment region 215. The force-transmitting surrounding wall 22 extends in the direction of central axis (X) from the circumferential abutment region 215, and is fitted in the surrounding groove 322 to be in engagement with the peripheral portion 32.

The twistable cap member 40 has a surrounding bottom wall 42 which is in the form of an abutting rim that is fitted in the marginal cutout portion 212 and that abuts against the circumferential abutment region 215, an inner tubular surface 41 which surrounds the central axis (X) and which has an internally threaded region 411 threadedly engaged with the externally threaded region 621 of the rod segment 62, and an operated portion 43 configured for being manually operable.

Figure 5:
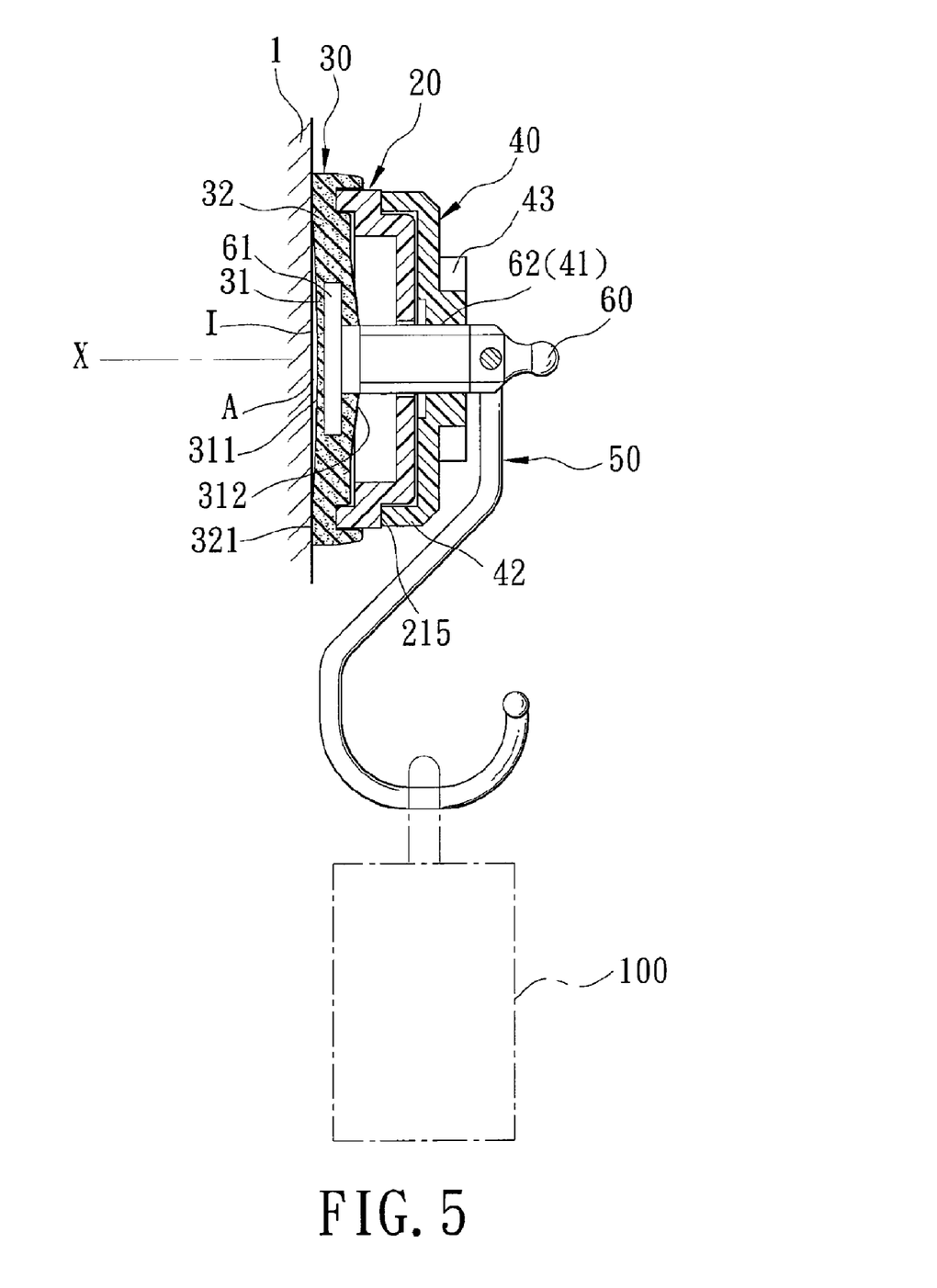
FIG. 5 is a sectional view of the first preferred embodiment in a state of use.
Figure 6:
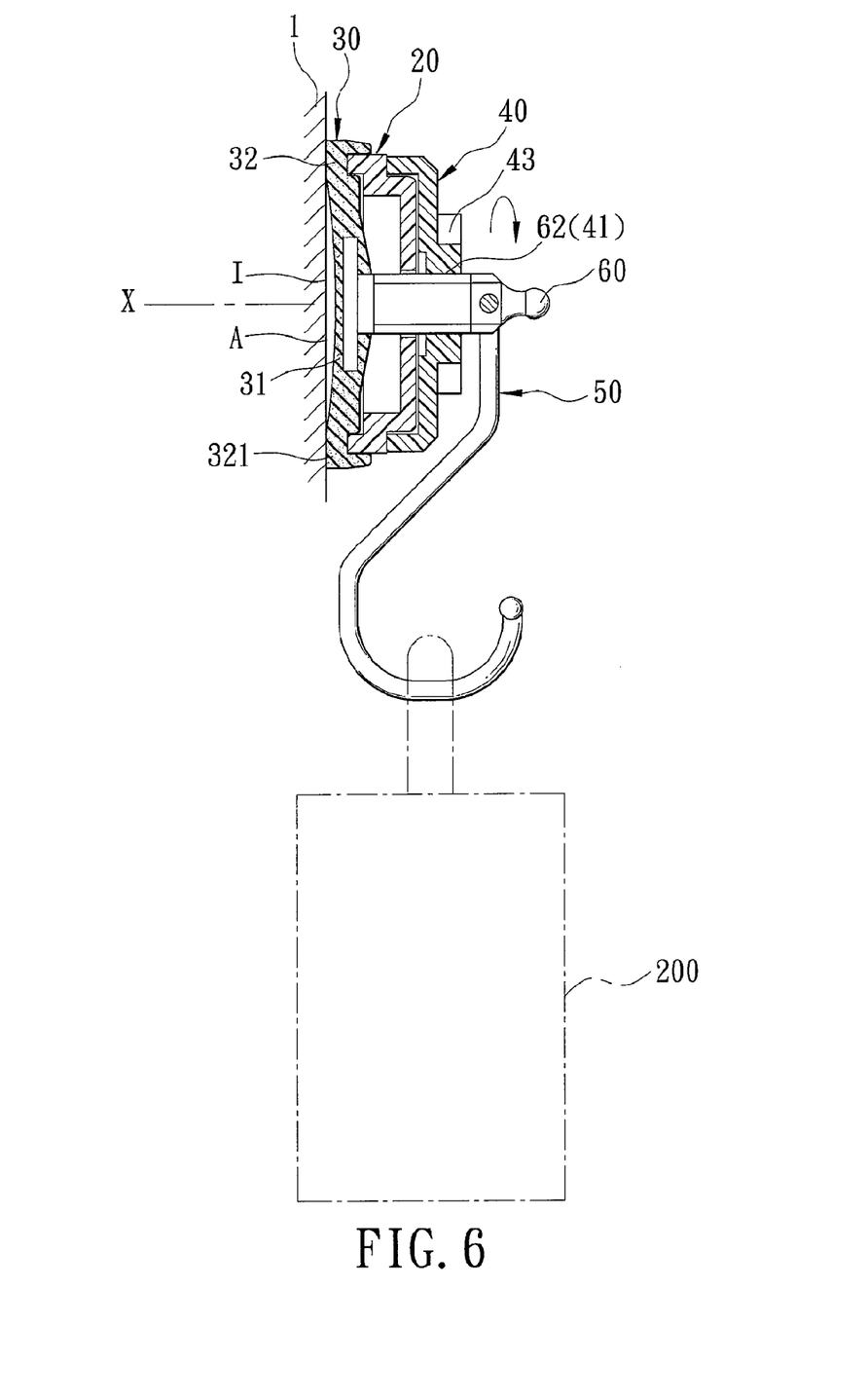
FIG. 6 is a sectional view of the first preferred embodiment when hanging a heavy article.

With reference to FIG. 5, as a result of a manually twisted movement of the twistable cap member 40, the rod segment 62 is axially moved relative to the inner tubular surface 41 so as to impart the base end 61 with the pulling force to deform the central portion 31, thereby producing the reduced pressure in the volume-variable space (A) for holding the suction cup device on the flat surface (I). Once the manually twisted movement of the twistable cap member 40 is discontinued for reaching a predetermined value of the reduced pressure, the surrounding bottom wall 42 is urged by the biasing force of the central portion 31 to abut against the circumferential abutment region 215, thereby ensuring the fluid-tight engagement of the marginal end 321 with the flat surface (I). It is noted that whenever the manually twisted movement of the twistable cap member 40 is discontinued, the liftable rod 60 is positioned by threaded engagement between the rod segment 62 and the inner tubular surface 41 so as to maintain the reduced pressure in the space (A) with the predetermined value, thereby rendering the operation of the suction cup device convenient. Moreover, by means of the biasing force that urges the twistable cap member 40 towards the cup forming unit 30, and by virtue of the abutment of the bottom wall 42 against the circumferential abutment region 215, and the abutment of the force-transmitting surrounding wall 22 against the peripheral portion 32, the fluid-tight engagement between the marginal end 321 and the flat surface (I) is enhanced and reliable. Referring to FIG. 6, when it is desired to hang a heavier object 200, the twistable cap member 40 can be manually twisted to further pull the central portion 31 away from the flat surface (I) so as to produce a reduced pressure with a larger value (i.e., the space (A) has a larger volume).

Figure 7:
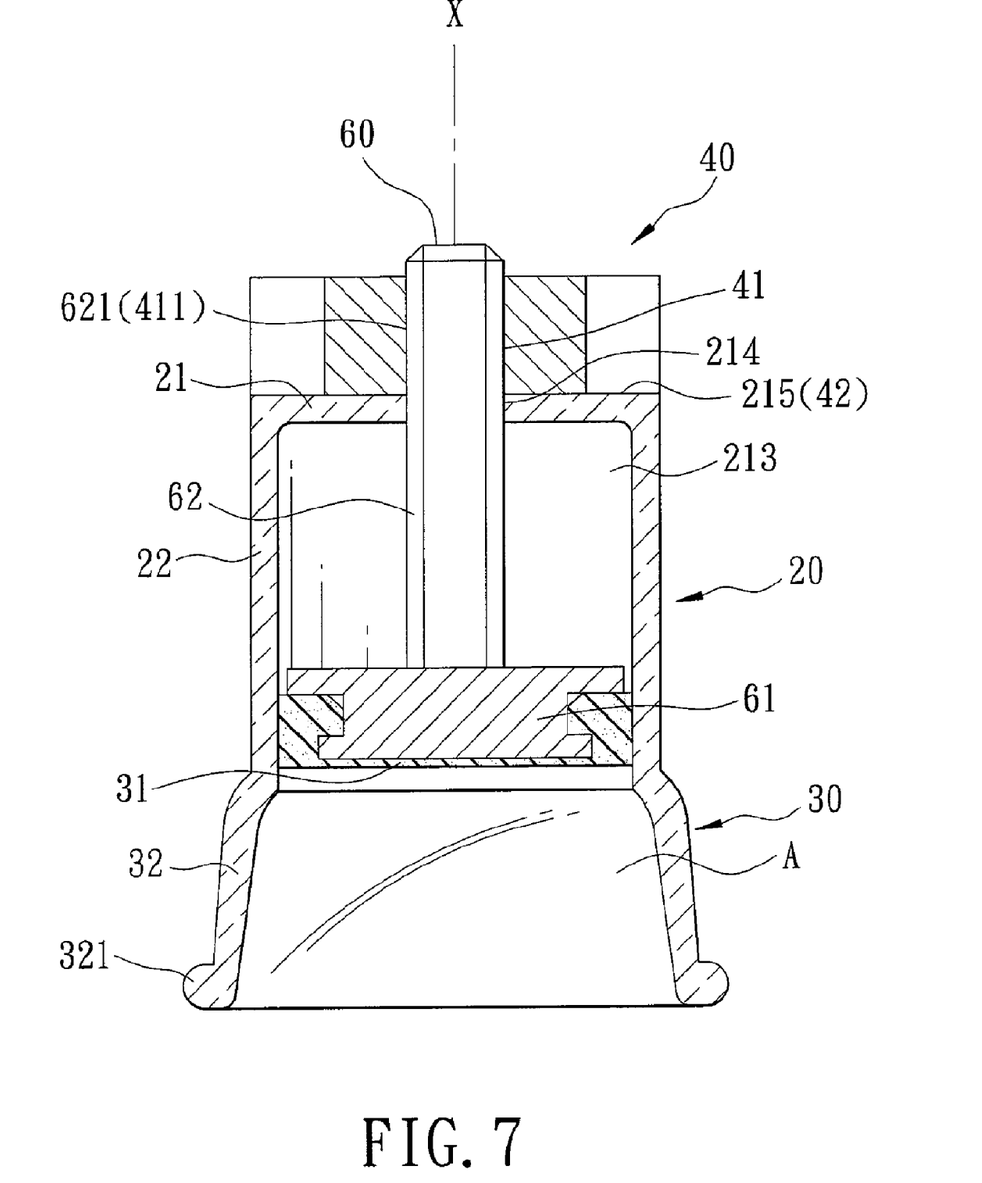
FIG. 7 is a sectional view of the second preferred embodiment of a suction cup device according to this invention.
Figure 8:
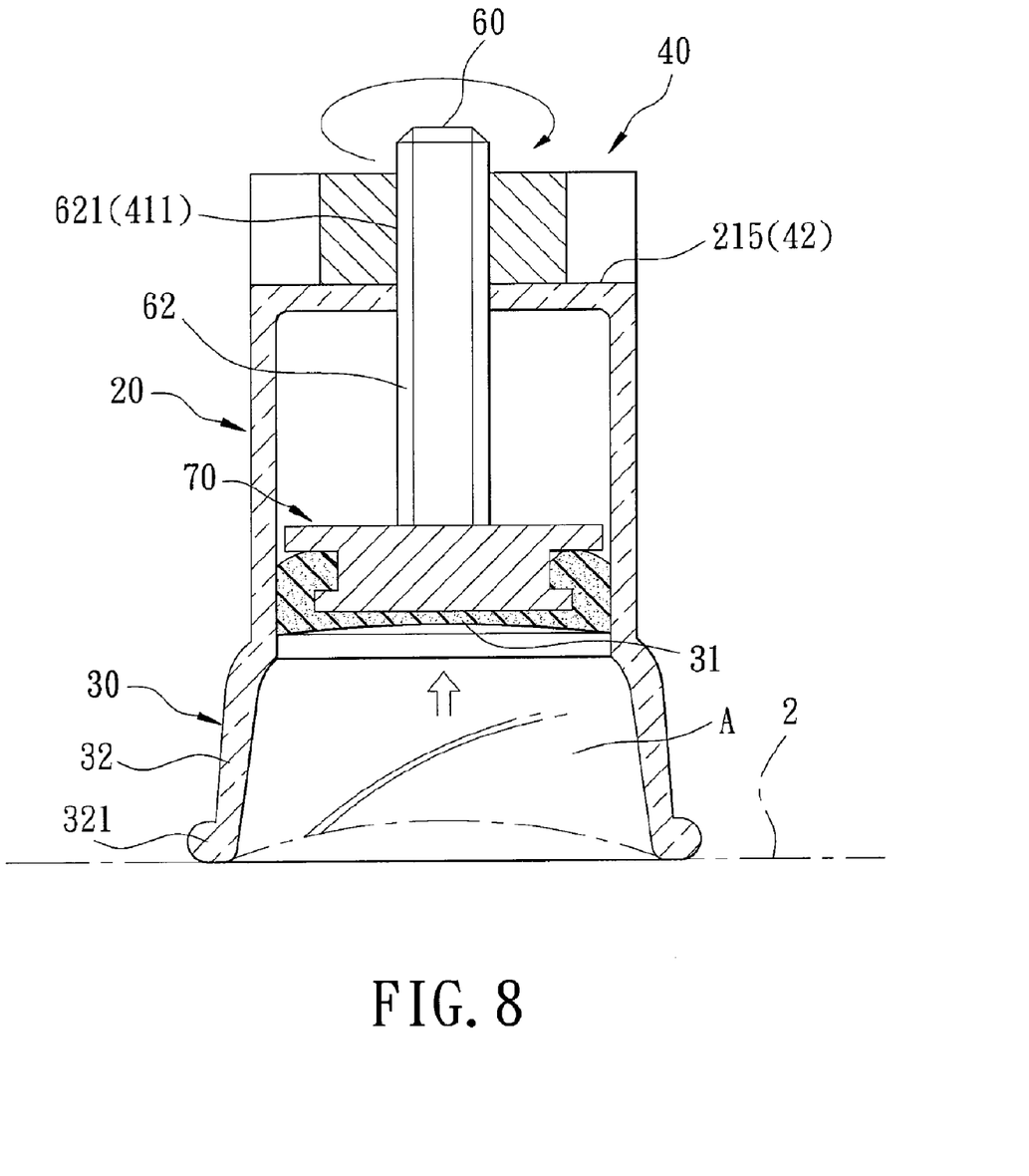
FIG. 8 is a sectional view of the second preferred embodiment in a state of use.

Referring to FIGS. 7 and 8, the second preferred embodiment of the suction cup device according to this invention is in the form of a cupping device for cupping therapy, and comprises a cup forming unit 30, a liftable rod 60, a bracing shell member 20, and a twistable cap member 40. In this embodiment, the peripheral portion 32 is in the form of a skirt, and is integrally formed with and is divergent from the force-transmitting surrounding wall 22 of the bracing shell member 20 to terminate at the marginal end 322, which is in the form of a flange for fluid-tight engagement with a flat surface 2, such as a skin surface. The central portion 31 of the cup forming unit 30 is in frictional engagement with the inner surface of the force-transmitting surrounding wall 22. As a result of the manually twisted movement of the twistable cap member 40, the rod segment 62 is axially moved to pull the central portion 31 away from the flat surface 2 so as to produce a reduced pressure in the volume-variable space (A) for holding the suction cup device on the flat surface 2.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A suction cup device comprising:
   a cup forming unit adapted to confront a flat surface, and defining a central axis normal to the flat surface to cooperate therewith to create a volume-variable space, said cup forming unit having
      a central portion which has suction-side and pull-side central surfaces opposite to each other in a direction of the central axis, and which is made from an elastic material such that, when said central portion is subjected to a pulling force along the central axis away from the flat surface, said suction-side surface is deformed to produce a reduced pressure in said volume-variable space while acquiring a biasing force to urge said central portion toward the flat surface, and
      a peripheral portion which extends from said central portion to terminate at a marginal end, said marginal end being configured to be in fluid-tight engagement with the flat surface;
   a liftable rod having a base end secured to said central portion, and a rod segment extending from said base end along the central axis and having an externally threaded region;
   a bracing shell member including
      a mount wall which is spaced apart from said central portion in the direction of the central axis, and which has a central hole that permits passage of said rod segment therethrough, and a circumferential abutment region that is disposed outwardly and radially of said central hole, said mount wall having a surrounding marginal cutout portion which extends towards said peripheral portion to terminate at said circumferential abutment region, and
      a force-transmitting surrounding wall which extends in the direction of central axis from said circumferential abutment region, and which is in engagement with said peripheral portion; and
   a twistable cap member having a surrounding bottom wall which abuts against said circumferential abutment region, and which is in form of an abutting rim that is configured to be fit in said marginal cutout portion, and an inner tubular surface which surrounds the central axis and which has an internally threaded region threadedly engaged with said externally threaded region such that, as a result of a manually twisted movement of said twistable cap member, said rod segment is axially moved relative to said inner tubular surface, thereby imparting said base end with the pulling force, and such that, once the manually twisted movement of said twistable cap member is discontinued for reaching a predetermined value of the reduced pressure, said surrounding bottom wall is urged by the biasing force to abut against said circumferential abutment region, thereby ensuring the fluid-tight engagement of said marginal end with the flat surface.

2. The suction cup device according to claim 1, wherein said liftable rod has a holder end opposite to said base end in the direction of the central axis for holding a fixture.

3. The suction cup device according to claim 1, wherein said peripheral portion has a surrounding groove which is configured to permit said force-transmitting surrounding wall to be fit therein.

4. A suction cup device comprising:
   a cup forming unit adapted to confront a flat surface, and defining a central axis normal to the flat surface to cooperate therewith to create a volume-variable space, said cup forming unit having
      a central portion which has suction-side and pull-side central surfaces opposite to each other in a direction of the central axis, and which is made from an elastic material such that, when said central portion is subjected to a pulling force along the central axis away from the flat surface, said suction-side surface is deformed to produce a reduced pressure in said volume-variable space while acquiring a biasing force to urge said central portion toward the flat surface, and
      a peripheral portion which extends from said central portion to terminate at a marginal end, said marginal end being configured to be in fluid-tight engagement with the flat surface;
   a liftable rod having a base end secured to said central portion, and a rod segment extending from said base end along the central axis and having an externally threaded region;
   a bracing shell member including
      a mount wall which is spaced apart from said central portion in the direction of the central axis, and which has a central hole that permits passage of said rod segment therethrough, and a circumferential abutment region that is disposed outwardly and radially of said central hole, and
      a force-transmitting surrounding wall which extends in the direction of central axis from said circumferential abutment region, and which is in engagement with said peripheral portion; and
   a twistable cap member having a surrounding bottom wall which abuts against said circumferential abutment region, and an inner tubular surface which surrounds the central axis and which has an internally threaded region threadedly engaged with said externally threaded region such that, as a result of a manually twisted movement of said twistable cap member, said rod segment is axially moved relative to said inner tubular surface, thereby imparting said base end with the pulling force, and such that, once the manually twisted movement of said twistable cap member is discontinued for reaching a predetermined value of the reduced pressure, said surrounding bottom wall is urged by the biasing force to abut against said circumferential abutment region, thereby ensuring the fluid-tight engagement of said marginal end with the flat surface; said peripheral portion is in form of a skirt and is divergent from said force-transmitting surrounding wall to terminate at said marginal end which is in form of a flange, said peripheral portion being integrally formed with said force-transmitting surrounding wall.

5. The suction cup device according to claim 4, wherein said peripheral portion and said bracing shell member are made from the same rigid material.

6. The suction cup device according to claim 1, wherein said bracing shell member is made from a rigid material.

* * * * *